W. J. WERNER.
SCRAPER GUARD AND SHARPENER.
APPLICATION FILED APR. 5, 1921. RENEWED JAN. 13, 1922.
1,412,728.   Patented Apr. 11, 1922.
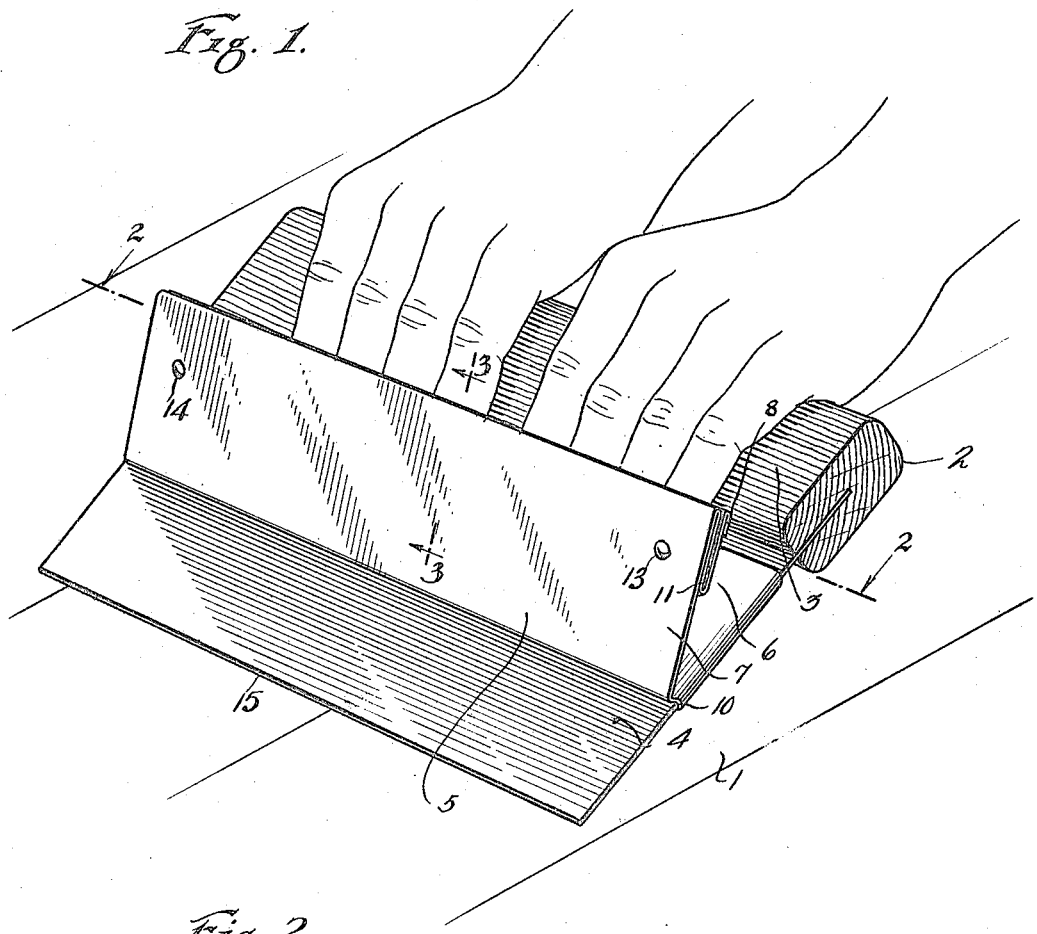
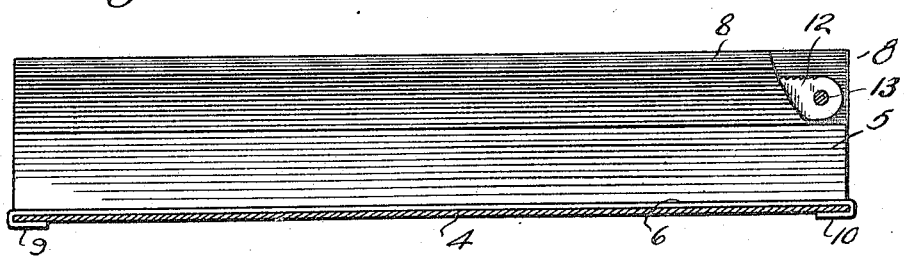
WITNESSES
INVENTOR
WILLIAM J. WERNER
BY
ATTORNEYS

UNITED STATES PATENT OFFICE.

WILLIAM J. WERNER, OF NEW YORK, N. Y.

SCRAPER GUARD AND SHARPENER.

1,412,728. Specification of Letters Patent. Patented Apr. 11, 1922.

Application filed April 5, 1921, Serial No. 458,660. Renewed January 13, 1922. Serial No. 529,096.

*To all whom it may concern:*

Be it known that I, WILLIAM J. WERNER, a citizen of the United States, and a resident of the city of New York, Ridgewood, borough of Queens, in the county of Queens and State of New York, have invented a new and Improved Scraper Guard and Sharpener, of which the following is a full, clear, and exact description.

This invention relates to guards for scrapers and has for an object to provide an improved construction which is automatically adjustable to suit the hand of any operator.

Another object of the invention is to provide a guard which is slidingly positioned on the scraper so as to be readily adjustable and at the same time protect the fingers of the operator against injury.

In the accompanying drawing:

Figure 1 is a perspective view of a scraper and a guard embodying the invention shown applied thereto, the scraper being illustrated as the same appears when in use.

Figure 2 is a sectional view through Figure 1 on line 2—2.

Fig. 3 is a cross section of the scraper guard.

Referring to the accompanying drawing by numerals 1 indicates a floor of any desired kind and 2 the scraper as a whole, said scraper comprising a handle 3 and a scraper blade 4 secured to the handle in any desired manner. Arranged on the blade 4 is a guard 5, which guard is provided with a base section 6 and a guard section 7. The guard section 7 is intended to extend at such an angle from the base section 6 as to properly protect the fingers of the operator as shown in Figure 1 when pushing the scraper in a forward direction. The section 7 is provided with a turned-over upper edge 8 which is pressed tightly against the section 7 whereby a smooth edge is provided with a minimum amount of labor. The ends of section 6 are turned over for forming guide-ways 9 and 10, said guide-ways being comparatively resilient as the guard 5 is made from metal. This resiliency produces a slight pinching action so that the guard will remain at any point on the blade 4, while at the same time permitting a quick and easy adjustment.

The scraper 2 may be used for scraping floors or other articles wherever desired, but this form of scraper and guard 5 is of special importance in scraping the floors and even the tables in a bakery shop. In bakery shops the workmen drop all kinds of articles including dough and ingredients from the articles being baked on the floor. These various droppings are walked on by the workmen from time to time so that at the end of the day the floor is almost covered and must be scraped in order to be brought back to the original clean condition. In this scraping action the scraper 2 is usually forced forwardly and in many instances splinters from the floor are raised which enter or strike against the fingers of the operator and thereby produce injury. To prevent this the guard 5 is arranged as shown in Figure 1 so that as the scraper is pushed forward the proper scraping action will result and any splinters taken up by the scraper will pass harmlessly over the guard and over the operator's fingers.

At the upper edge of the guard 7 the material is bent downwardly for forming a longitudinal socket 11 which is adapted to receive the saw blade 12 which saw blade is held in place by suitable rivets 13 and 14. It will be noted from Figures 2 and 3 that the blade is spaced downwardly an appreciable distance from the upper edge of guard 7 so that it will not in any way interfere with the fingers while presenting an implement which may be used at any time for sharpening the front edge 15 of the scraper blade 4. In use, the edge 15 engages the floor and in scraping the latter the edge 15 becomes worn and usually worn in an uneven manner. To secure the best results it is preferable to have this edge straight and in order to maintain the implement in this condition, saw 12 is provided. When it is desired to sharpen or straighten the edge 15 the blade 4 is removed from the guard and the edge 15 inserted in the socket 11 until it engages the teeth of the saw. The back and forth movement of the blade 4 with a slight pressure will result in the teeth of the saw removing part of the blade 4 and removing the same in such a manner as to straighten the edge 15 and cause said edge to be in a plane substantially at right angles to the plane of the surface of blade 4. After the edge 15 has been thus sharpened the blade 4 is removed from groove 11 and adjusted to substantially the position shown in Figure 1 whereupon it is ready for use.

What I claim is:

1. A scraper guard comprising a base section adapted to fit flatwise against the scraper blade, a pair of guides extending from said base section so as to overlap the edges of said blade, and a substantially upstanding section arranged along one edge of said base section.

2. The combination with a scraper provided with a flat scraping blade of a guard therefor comprising a base section, and a guard section extending from one edge of the base section at an acute angle, said base section being formed with end extensions bent for producing resilient groove members overlapping the edges of the blade of said scraper.

3. A guard for flat blade scrapers comprising a base section formed with an extension at each end bent for producing guides in which the blade of the scraper slides, the guard section extending from one end of the base section at an acute angle, and a turned over edge on said guard section.

4. A guard for a flat bladed scraper comprising a base section, a bent up guard section, means forming the guard section presenting a groove and a saw arranged in said groove adapted to act on the edge of the scraper for sharpening the same whenever said scraper is inserted in said groove.

WILLIAM J. WERNER.